J. H. GROTH.
DIE FOR GLASS PRESSING MACHINES.
APPLICATION FILED OCT. 6, 1917.
1,290,738.
Patented Jan. 7, 1919.
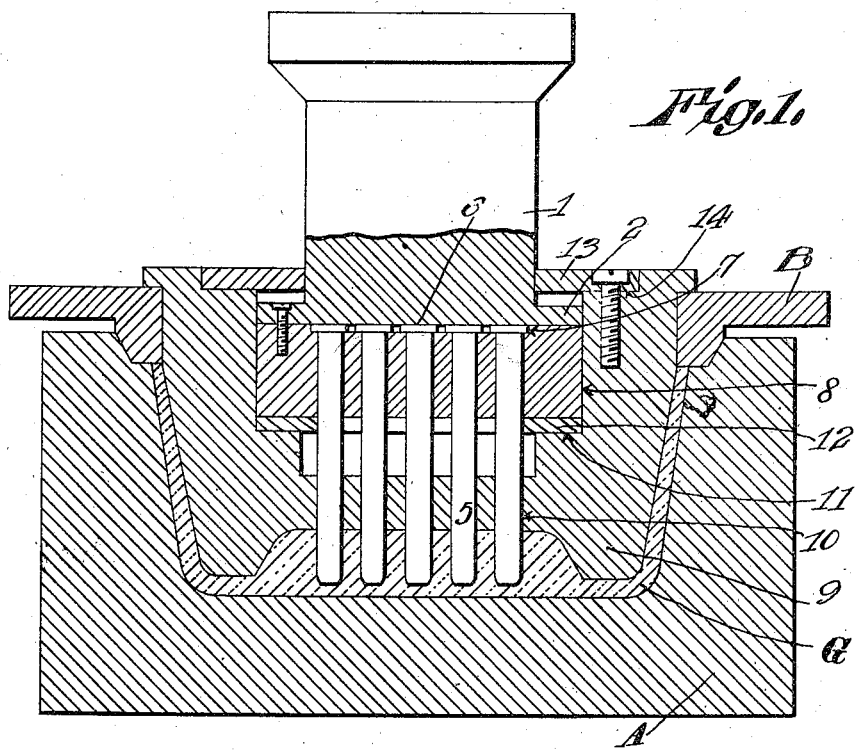
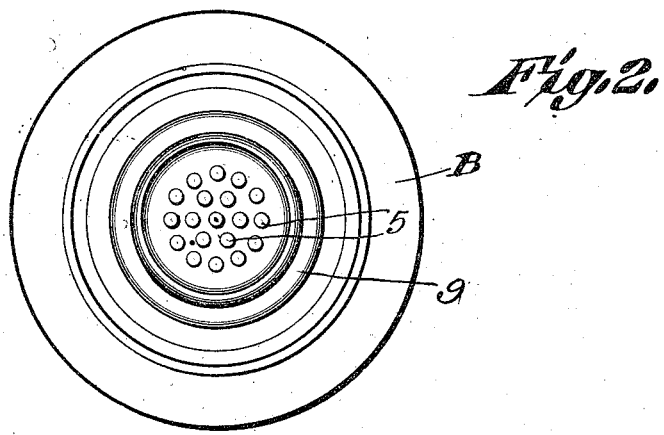
Witnesses
Inventor
J. H. Groth
by
Attorneys

UNITED STATES PATENT OFFICE.

JOHN H. GROTH, OF BEAVER FALLS, PENNSYLVANIA.

DIE FOR GLASS-PRESSING MACHINES.

1,290,738. Specification of Letters Patent. Patented Jan. 7, 1919.

Application filed October 6, 1917. Serial No. 195,095.

*To all whom it may concern:*

Be it known that I, JOHN H. GROTH, a citizen of the United States, residing at Beaver Falls, in the county of Beaver and State of Pennsylvania, have invented a new and useful Die for Glass-Pressing Machines, of which the following is a specification.

This invention relates to dies for use in connection with glass pressing machines, one of the objects of the invention being to provide a die primarily intended for shaping glass articles having recesses or apertures extending thereinto, as, for example, holders for cut flowers.

One of the objects of the invention is to provide a die utilizing a pin carrying member which is movable relative to the main body of the die or plunger whereby, when the die is lifted out of the mold, the pins will first be partly withdrawn so as to be freed from the glass after which the main plunger of the die will be lifted out of the mold.

A further object is to provide a die having means whereby the movement of the pins relative to the main plunger can be varied.

With the foregoing and other objects in view, which will appear as the description proceeds the invention resides in the combination and arrangement of parts and in the details of construction hereinafter described and claimed, it being understood that changes in the precise embodiment of the invention can be made within the scope of what is claimed without departing from the spirit of the invention.

In the accompanying drawings the preferred form of the invention has been shown.

In said drawings:—

Figure 1 is a section through a mold having the present improvements combined therewith.

Fig. 2 is a bottom plan view of the male die or mold.

Referring to the figures by characters of reference A designates the fixed mold of a glass pressing machine and is adapted to receive a plunger mold or die of novel form constituting the present invention.

This includes a stem 1 which is adapted to be attached in any manner desired, to the plunger of a glass pressing machine and is provided, at its lower end, with a circular flange 2. This flange is secured upon the recessed upper face of a disk 3, there being a plurality of apertures for extending through the disk and in which are removably mounted pins 5 having heads 6 seated in the recess 7 in the disk. The flange 2 and stem 1 are adapted to bear upon the heads 6 and thus hold the pins 5 fixedly within the openings 4. However should it be desired to remove the pins it becomes merely necessary to disconnect the flange 2 from the disk 3. The parts 2 and 3 can be held together by means of screws or in any other desired manner.

The flange 2 and disk 3 are seated within a circular recess 8 formed in the body portion 9 of the die, this body portion being of any desired external contour and having openings 10 in the bottom thereof within which the pins 5 are slidably mounted. An annular seat 11 is formed within the plunger 9 close to the bottom and supports a spacing washer 12. A retaining ring 13 is detachably secured upon a seat 14 formed in the top portion of the plunger 9, this ring serving to limit the upward movement of the flange 2 relative to the plunger 9.

In using the die herein described the gather G to be pressed is placed in the mold A under a ring B and the die is moved down into the mold, the disk 3 pressing on the spacing ring or washer 12 so that the pins 5 will project downwardly from the bottom of the plunger 9 and into the gather G while the gather is being shaped by the mold and the plunger 9. The stem 1 is then pulled upwardly and this will result, first, in the upward movement of the pins 5 relative to the plunger 9 until the flange 2 comes against the ring 13 whereupon the plunger 9 will be lifted out of the mold A. Thus the pins are first loosened from the gather after which the plunger 9 is withdrawn, thereby insuring a more perfect product than would be possible should the pins and the plunger be started simultaneously in their upward movement.

By using rings or washers 12 of different thicknesses the amount of relative movement of the pins 5 and plunger 9 can be varied.

It is to be understood of course that the improvements herein described can be applied to any form of glass pressing machine.

It is also to be understood that articles of various shapes and sizes can be produced by means of dies embodying the present improvements but in every instance it is desirable that the pins be started upwardly before the removal of the plunger portion of the die.

What is claimed is:—

1. A die for glass pressing machines, including a hollow body portion having an annular seat therein, there being apertures in the end of the body portion, a disk mounted for limited sliding movement within the body portion, said disk having a recessed face, pins removably seated in and extending beyond the disk and slidable in the openings in the body portion, said ends having heads seated in the recesses in the disks, a stem projecting into the body portion and secured to the disks, said stem contacting with the heads of the pins to hold the heads against movement relative to the disks and a retaining ring secured to the body portion and around the stem and overhanging the disk for limiting the movement of the disk relative to the body portion.

2. A die for glass pressing machines, including a hollow body portion having apertures in one end and an annular seat, a retaining ring secured to one end of the body portion and overhanging the space therein, a disk slidably mounted within the body between the annular seat and the ring and having a plurality of apertures, there being a recess in one face of the disk, pins detachably seated in the apertures in the disk and slidable within the apertures in the body portion, heads on the pins and seated within the recess in the disk, and a stem slidably mounted in the ring and secured to the disk, said stem engaging the heads to hold the pins against movement relative to the disk.

In testimony that I claim the foregoing as my own, I have hereto affixed my signature in the presence of two witnesses.

JOHN H. GROTH.

Witnesses:
　JOHN H. STURGEON,
　C. W. MELTON.